US011018554B2

(12) United States Patent
Vannan, Jr. et al.

(10) Patent No.: US 11,018,554 B2
(45) Date of Patent: May 25, 2021

(54) METHOD OF GENERATING HYDRO ELECTRIC ENERGY IN RIVERS AND STREAMS WITHOUT DAMS AND/OR LOCKS

(71) Applicants: Frederick Forbes Vannan, Jr., Clinton, OH (US); John Brian Dahl, Vienna, WV (US)

(72) Inventors: Frederick Forbes Vannan, Jr., Clinton, OH (US); John Brian Dahl, Vienna, WV (US)

( * ) Notice: Subject to any disclaimer, the term of this patent is extended or adjusted under 35 U.S.C. 154(b) by 212 days.

(21) Appl. No.: 15/330,417

(22) Filed: Sep. 19, 2016

(65) Prior Publication Data
US 2018/0083508 A1    Mar. 22, 2018

(51) Int. Cl.
*H02K 7/18*   (2006.01)
*F03B 13/10*  (2006.01)
*F03B 13/08*  (2006.01)

(52) U.S. Cl.
CPC .......... *H02K 7/1823* (2013.01); *F03B 13/08* (2013.01); *F03B 13/10* (2013.01); *F05B 2240/13* (2013.01); *Y02E 10/20* (2013.01)

(58) Field of Classification Search
CPC ........ H02K 7/1823; F03B 13/10; F03B 13/08
USPC .................................. 290/42, 43, 52, 53, 54
See application file for complete search history.

(56) References Cited

U.S. PATENT DOCUMENTS

| | | | | |
|---|---|---|---|---|
| 4,078,871 A * | 3/1978 | Perkins, Jr. | ........... | F03B 13/147 290/53 |
| 4,143,990 A * | 3/1979 | Atencio | ................... | E02B 9/00 290/53 |
| 4,494,567 A * | 1/1985 | Troyen | .................... | F03B 11/00 137/561 A |
| 4,782,663 A * | 11/1988 | Bellamy | ............... | F03B 13/188 290/53 |
| 4,804,855 A * | 2/1989 | Obermeyer | ............. | F03B 13/08 290/43 |
| 5,105,094 A * | 4/1992 | Parker | ................... | F03B 13/148 290/42 |
| 5,754,446 A * | 5/1998 | Fisher, Jr. | ............... | F03B 15/12 290/40 R |
| 2009/0152871 A1* | 6/2009 | Ching | ....................... | F03B 1/00 290/54 |
| 2010/0135766 A1* | 6/2010 | Allaei | ..................... | F03B 11/02 415/1 |
| 2011/0006531 A1* | 1/2011 | Ghouse | .............. | F03B 13/1815 290/53 |
| 2011/0109089 A1* | 5/2011 | Frye | ........................ | F03B 13/08 290/54 |
| 2011/0260460 A1* | 10/2011 | Rovinsky | ................ | F03B 13/10 290/54 |
| 2012/0146330 A1* | 6/2012 | Shifrin | ..................... | F03B 3/06 290/43 |
| 2014/0312624 A1* | 10/2014 | da Silva | .................... | F03B 3/06 290/52 |
| 2015/0014995 A1* | 1/2015 | Nishioka | ................. | F03B 13/00 290/52 |

(Continued)

FOREIGN PATENT DOCUMENTS

WO    WO 2015072869 A1 *   5/2015   ............. E02B 3/046

*Primary Examiner* — Viet P Nguyen

(57) ABSTRACT

A method of generating hydro-electric energy utilizing a conduit located beneath the surface of a river or stream to feed water into a hydro-electric turbine, eliminating the need to build costly and time-consuming dams and locks.

16 Claims, 6 Drawing Sheets

Elevation View

(56) References Cited

U.S. PATENT DOCUMENTS

Figure 1:
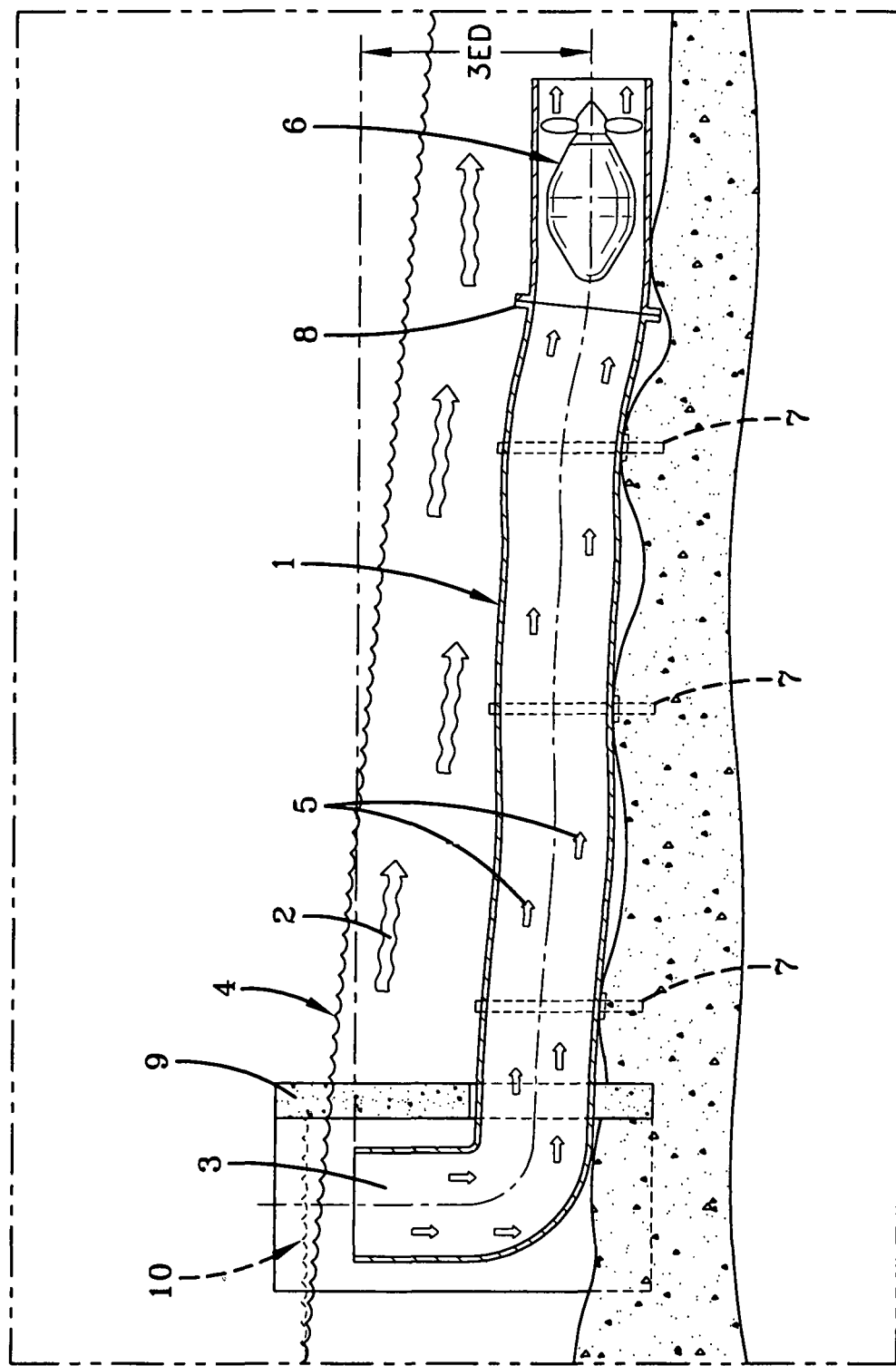

| | | | |
|---|---|---|---|
| 2015/0167626 A1* | 6/2015 | Roberts | F03B 13/08 |
| | | | 415/121.3 |
| 2015/0198138 A1* | 7/2015 | Hanna | F03B 13/10 |
| | | | 290/52 |
| 2016/0208766 A1* | 7/2016 | Fei | F03B 13/00 |
| 2016/0290310 A1* | 10/2016 | Bhende | F03B 13/086 |
| 2016/0298596 A1* | 10/2016 | Pereira De Gouveia Lopes De Almeida | E02B 3/046 |
| 2017/0145981 A1* | 5/2017 | Culpepper | F03B 3/126 |

* cited by examiner

Elevation View

Two Conduit/Turbine Plan View

Two Conduit/ Four Turbine Plan View

Elevation View

Elevation View

Conduit Cross Section

METHOD OF GENERATING HYDRO ELECTRIC ENERGY IN RIVERS AND STREAMS WITHOUT DAMS AND/OR LOCKS

Most large hydro-electric energy generation facilities utilize large expensive dams which flood sometimes useful land forming a lake or hamper river navigation requiring expensive lock systems.

The most suitable natural falls and dam locations on rivers in the world are already being utilized to generate hydro-electric energy. Some existing dams on rivers are being utilized to generate hydro-electric energy where cost vs benefits analysis can justify the project.

There are many rivers and streams in the world which have a flow rate and elevation drop suitable for hydro-electric generation, but are not suitable for dams Because they would hamper river transportation or flood valuable land.

SUMMARY OF INVENTION

This invention provides a novel method for generating hydro-electric power on rivers and streams without requiring the building of expensive and time consuming dams and locks and without hindering river transportation or the environment.

The method of this invention utilizes a conduit located at least partially beneath the surface of a river or stream to feed water into a hydro-electric turbine. The conduit is positioned in the direction of river water flow with the inlet end of the conduit upstream and at a higher elevation than the downstream end of the conduit which feeds water into a hydro-electric turbine.

The upstream water inlet end of the conduit can be positioned to be near the river water surface and the downstream end of the conduit is attached to the hydro-electric turbine which is below the water surface.

A semi-circular coffer dam can be used at the inlet end of the conduit to utilize river flow rate to increase river water surface elevation at the inlet end of the conduit and thereby increase the head pressure at the hydro-electric turbine.

The conduit of this invention can have any cross-sectional shape including the following shapes: circular, oval, rectangular and square and it can be made of any material including plastic and metal.

The conduit of this invention can be seamless or seamed in any direction including seams parallel and/or perpendicular to the direction of water flow inside the conduit.

The conduit of this invention can be made from two or more flat sheets of material seamed along both sides parallel to the water flow inside the conduit.

The conduit of this invention can have multiple inlets and/or multiple exits feeding multiple hydro-electric turbines.

The conduit of this invention can be attached to the bottom or shore line of a river or stream.

The elevation of the inlet end of the conduit can be mechanically adjusted to maximize turbine head pressure at various river levels. The elevation of the inlet end of the conduit can also be controlled by floatation.

The hydro-electric turbine of this invention can be positioned to be above the downstream river water surface elevation and below the conduit inlet elevation.

DESCRIPTION OF DRAWINGS (DRAWINGS NOT TO SCALE)

FIG. 1 shows an elevation view of the conduit (1) fully submerged in a river flowing from left to right (2). The conduit inlet (3) is below the river surface (4) to allow gravity to fill the conduit. The water flows (5) through the conduit from the inlet (3) to the hydro-turbine (6) because the conduit inlet is at a higher elevation than the hydro-turbine. The elevation drop (3ED) from the conduit inlet to the hydro-turbine provides the head pressure required to drive the hydro-turbine which produces electric power. FIG. 1 also shows the conduit attached to the river bottom with straps (7) and to the hydro-turbine connection (8).

Figure 2:
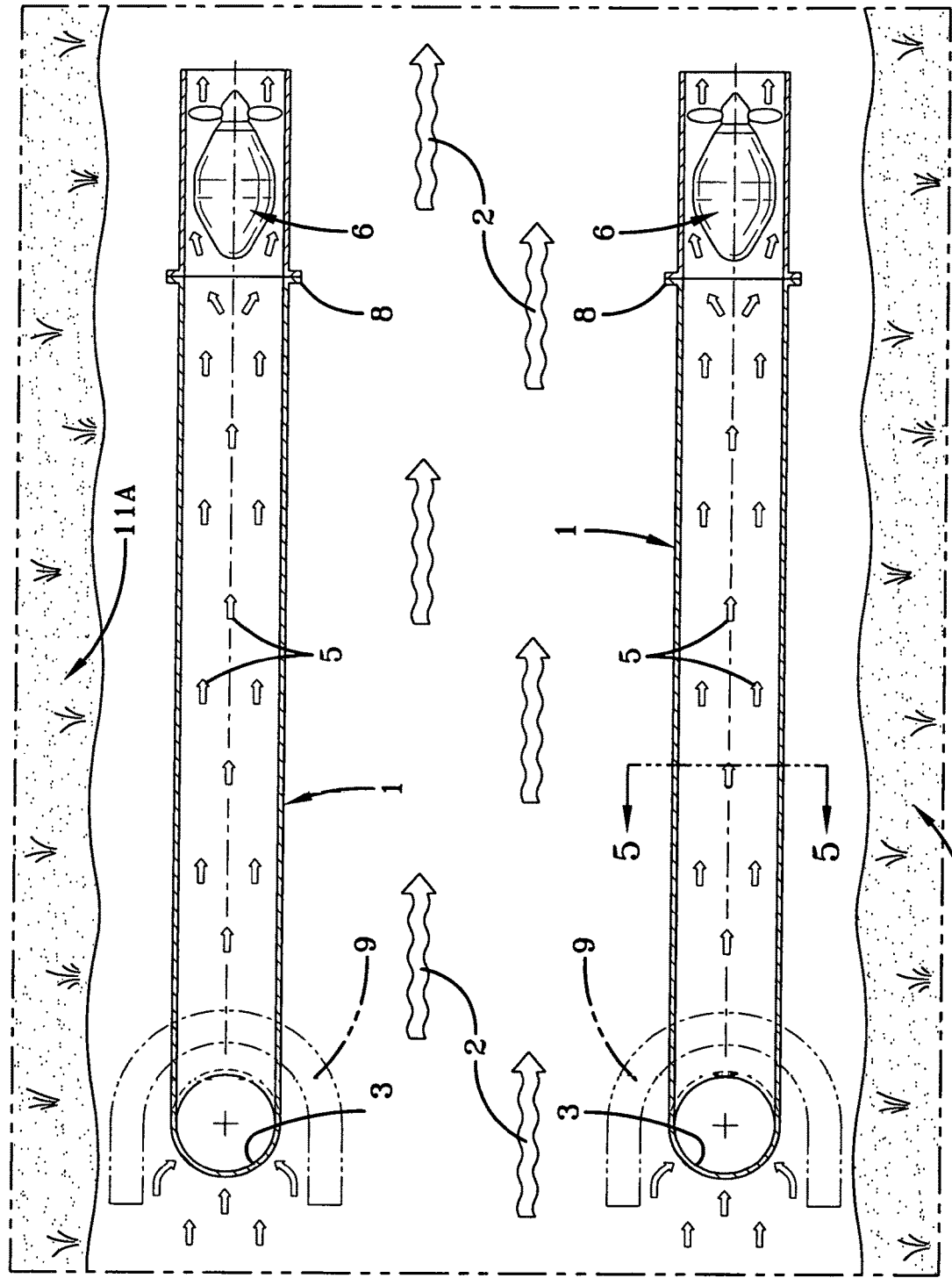

FIG. 2 shows a plan view of two identical conduit/turbine systems with one system on each side (11A and 11B) of a river. Each conduit/turbine system has one conduit inlet (3) and one connection (8) to one hydro-turbine (6).

A semi-circular coffer dam (9) is shown around the conduit inlet (3) in FIG. 1 and each inlet (3) in FIG. 2. The coffer dams utilize river flow (2) to increase river surface elevation (10) at the conduit inlets and thereby increase head pressure at the hydro-turbine.

Figure 3:
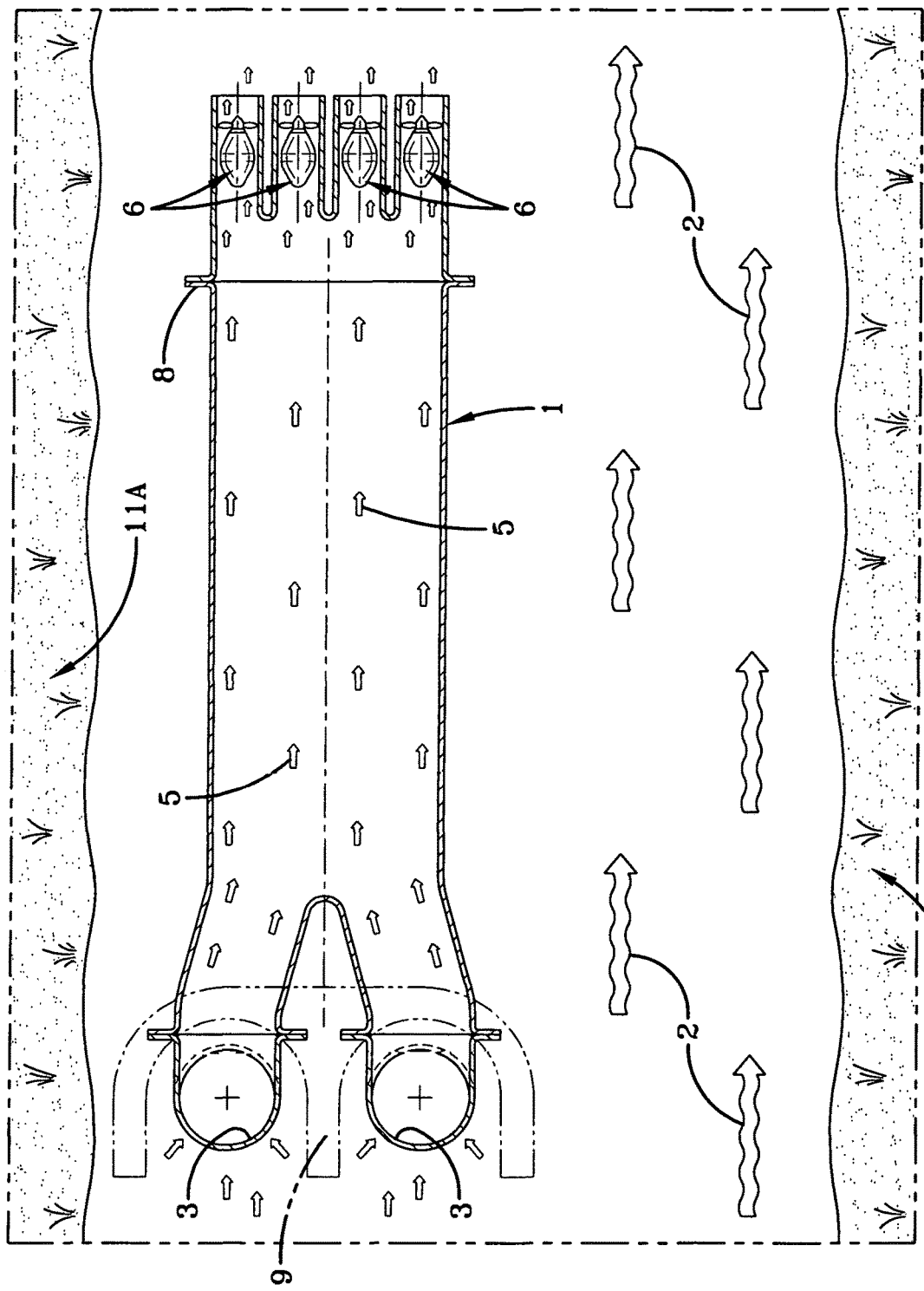

FIG. 3 shows a plan view of a conduit/turbine system with two conduit inlets (3) and four conduit exits each feeding one of four hydro-turbines (6).

Figure 4A:
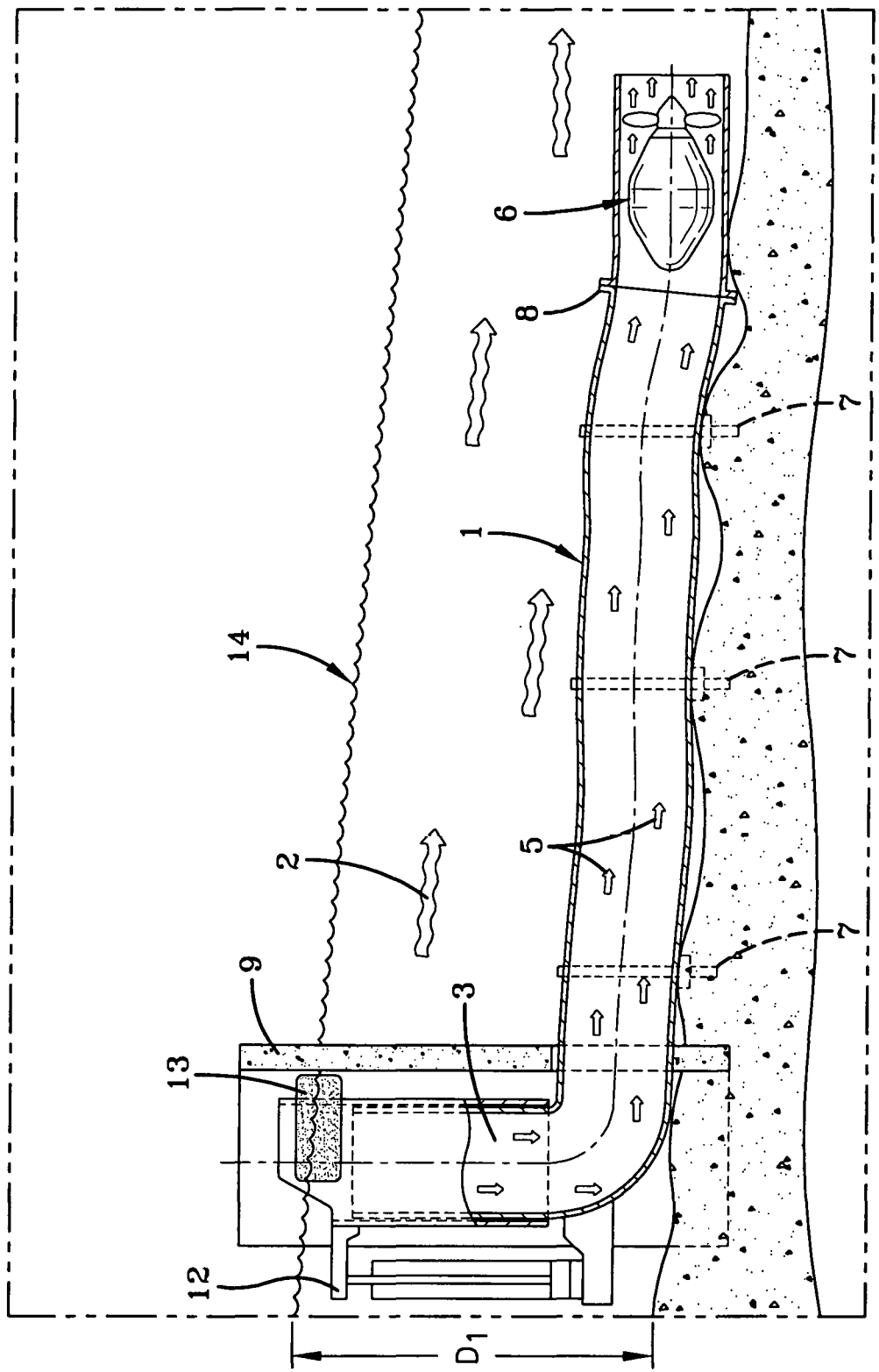
Figure 4B:
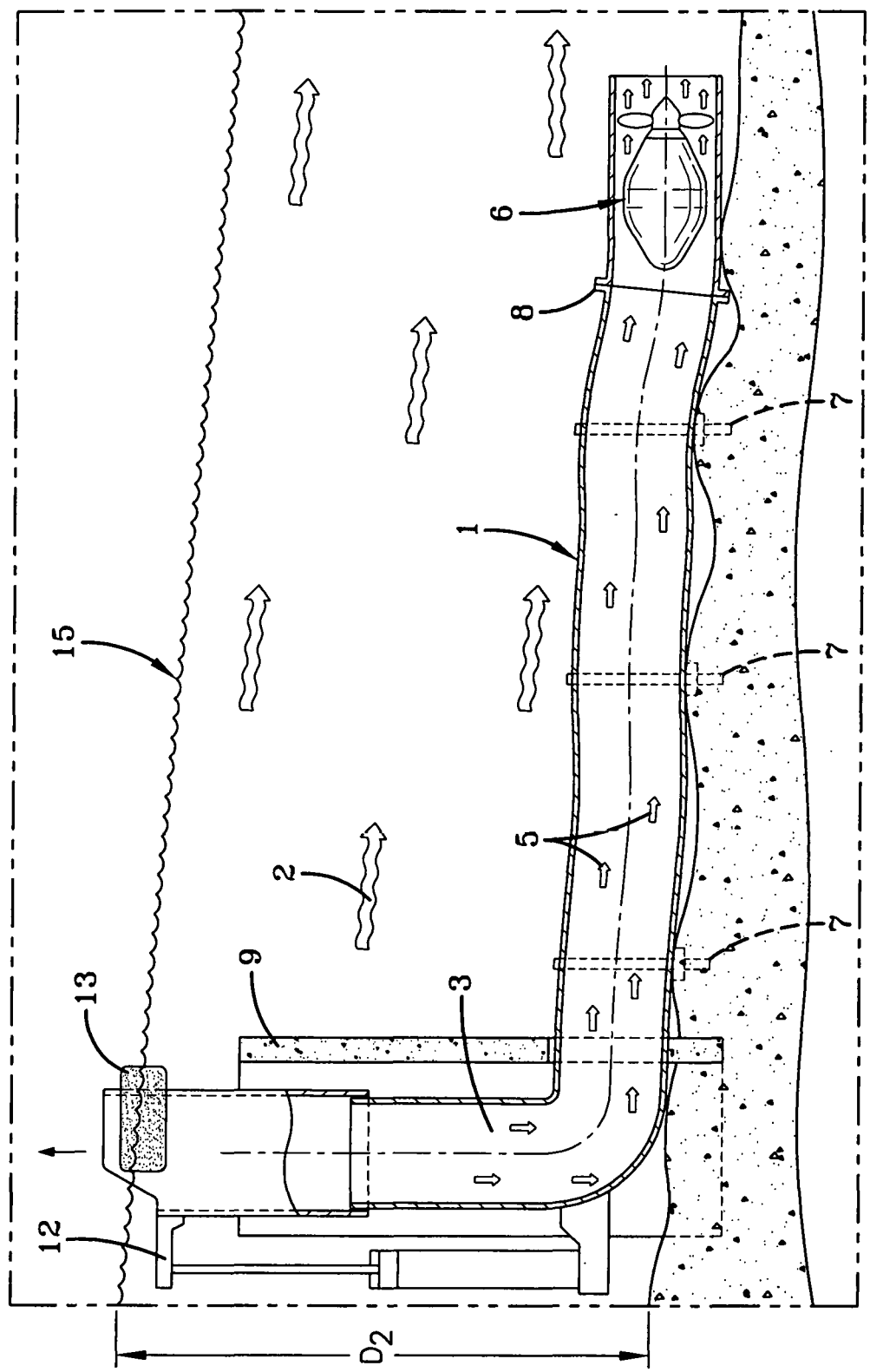

FIG. 4A and FIG. 46 show elevation views of a single conduit/turbine system wherein the elevation of the inlet end (3) of the conduit (1) is vertically adjustable using a mechanical mechanization (12) or a floatation mechanization (13) to maximize head pressure at various river levels. FIG. 4A shows the river surface at low elevations (14) and depths (D1) during dry seasons and FIG. 46 shows the river surface at higher elevations (15) and depths (D2) during wet seasons.

Figure 5:
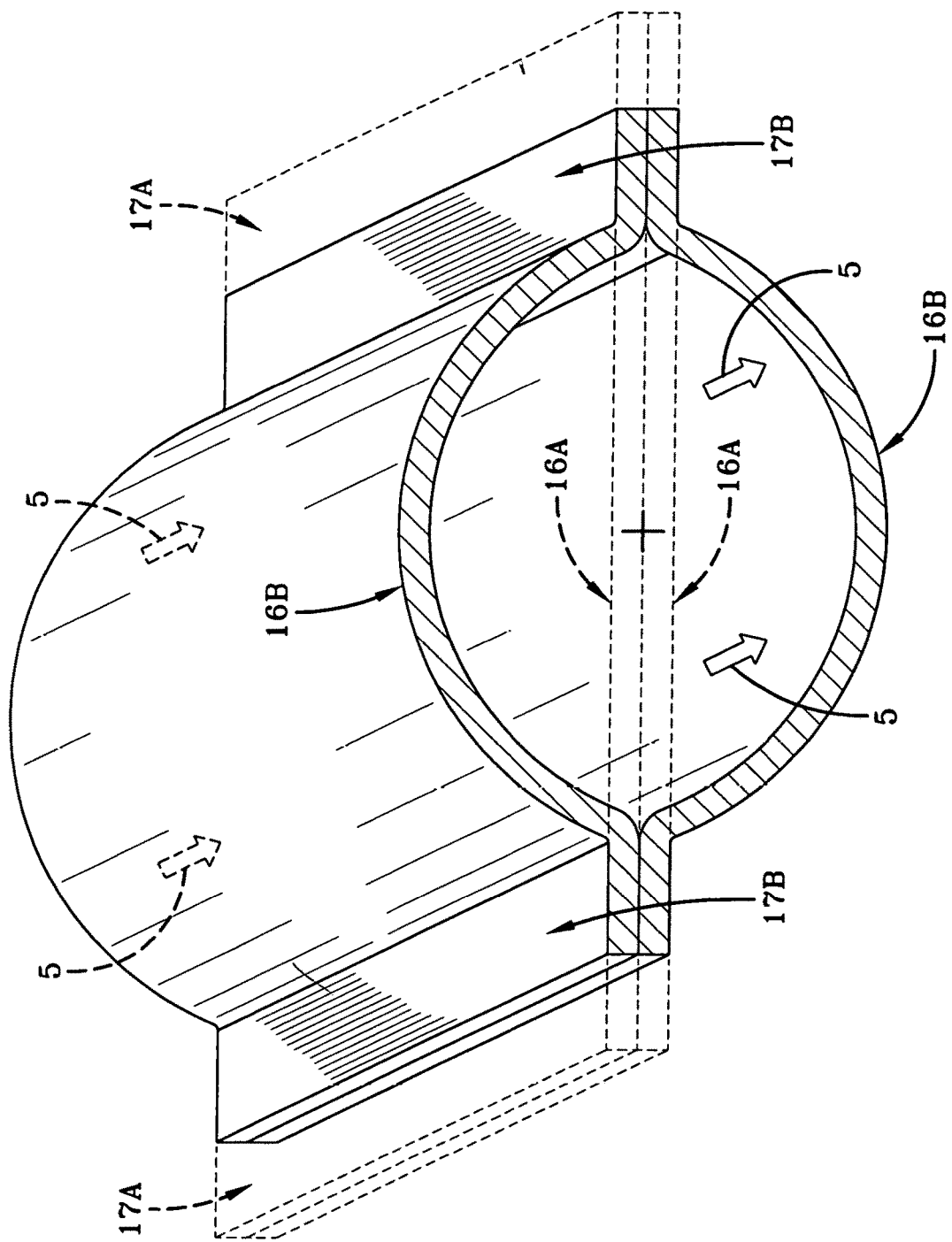

FIG. 5 shows a cross-sectional view of a conduit made from two flat sheets of any suitable material seamed along its length on both sides (17A) parallel to water flow (5) inside the conduit. The broken parallel lines show the two flat sheets (16A) of the conduit seamed at the edges (17A) but without water inside the conduit. The solid lines show the same seamed conduit (166) and seams (17B) with water flowing inside the conduit (5) and causing the cross-sections shape to be oval or circular.

The invention claimed is:

1. A hydro-electric generation system for use in rivers which is comprised of a conduit having an inlet end and a downstream end and a hydro-electric turbine which is situated at the downstream end of the conduit through an exit attachment, wherein the conduit is positioned in the direction of water flow with the inlet end of the conduit being upstream and at a higher elevation in the river than the downstream end of the conduit, wherein the inlet and of the conduit is positioned in the river at a point where the river has a higher surface level than does the river at the downstream end of the conduit.

2. The hydro-electric generation system of claim 1 wherein a semi-circular coffer dam is situated at the inlet end of the conduit to utilize river flow rate to increase river water surface elevation at the inlet and of the conduit and thereby increase head pressure at the hydro-electric turbine.

3. The hydro-electric generation system of claim 1 wherein the conduit is made from two flat sheets of material seamed along its length on both sides.

4. The hydro-electric generation system of claim 1 wherein the conduit has multiple inlets feeding multiple hydro-electric turbines.

5. The hydro-electric generation system of claim 1 wherein the conduit is attached to a river bottom or a river shoreline of the river.

6. The hydro-electric generation system of claim 1 which is further comprised of a means for adjusting the elevation of the inlet end of the conduit to maximize turbine head pressure at various river levels.

7. The hydro-electric generation system of claim 6 wherein the elevation of the inlet end of the conduit is controlled by floatation.

8. The hydro-electric generation system of claim 6 which is further comprised of a mechanical mechanism for adjusting the elevation of the inlet end of the conduit.

9. The hydro-electric generation system of claim 1 wherein the hydro-electric turbine is positioned to be above the downstream river water surface elevation and below the elevation of the conduit inlet.

10. A method for producing electric power which comprises generating electricity with the hydro-electric generation system as specified in claim 1.

11. A method for generating hydro-electric energy which comprises creating a pressure head to power the hydro-electric turbine in the hydro-electric generation system specified in claim 1 from the natural downward flow of water in the river.

12. The method for generating hydro-electric energy of claim 11 wherein the pressure head is increased by adjusting the elevation of the inlet end of the conduit.

13. A method for generating hydro-electric energy which comprises allowing the water flow of the river to flow through the conduit of the hydro-electric generation system as specified in claim 1 to create a pressure head to power the hydro-electric turbine.

14. The hydra-electric generation system of claim 1 wherein the conduit has multiple exits feeding multiple hydro-electric turbines.

15. The method of claim 1 wherein the conduit is comprised of plastic.

16. The method of claim 1 wherein the conduit is comprised of metal.

* * * * *